United States Patent
Hartmann et al.

(10) Patent No.: US 12,425,379 B1
(45) Date of Patent: Sep. 23, 2025

(54) VOICE IDENTIFICATION ASSISTED END-TO-END CRYPTOGRAPHY

(71) Applicant: Amazon Technologies, Inc., Seattle, WA (US)

(72) Inventors: Curtis Gill Hartmann, Seattle, WA (US); Thushara Paul, Seattle, WA (US); Amalavoyal Chari, Seattle, WA (US); Michael Mark Goodwin, Seattle, WA (US); John Joseph Dunne, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 348 days.

(21) Appl. No.: 18/194,507

(22) Filed: Mar. 31, 2023

(51) Int. Cl.
*H04L 9/40* (2022.01)
*G10L 17/00* (2013.01)
*H04L 9/16* (2006.01)

(52) U.S. Cl.
CPC .......... *H04L 63/0428* (2013.01); *G10L 17/00* (2013.01); *H04L 9/16* (2013.01)

(58) Field of Classification Search
CPC .............................. H04L 63/0428; H04L 9/16
See application file for complete search history.

(56) References Cited

PUBLICATIONS

Monrose et al., "Using Voice to Generate Cryptographic Keys", 2001: A Speaker Odyssey—The Speaker Recognition Workshop, 2001, in 6 pages.

Primary Examiner — Esther B. Henderson
(74) Attorney, Agent, or Firm — Knobbe Martens Olson & Bear LLP (57) ABSTRACT

A computing device may generate a first cryptographic key data for communicating with a second computing device. A computing device may receive, by a microphone of the computing device, a sound information, wherein the first sound information represents speech occurring during a multi-participant conversation. A computing device may generate a sound embedding using the sound information. A computing device may compare the sound embedding to each speaker embedding of a set of speaker embeddings stored in a memory of the computing device to generate a result. A computing device may identify, based on the result, a current active speaker. A computing device may generate a second cryptographic key data, based in part on a speaker embedding associated with the current active speaker.

20 Claims, 6 Drawing Sheets

VOICE IDENTIFICATION ASSISTED END-TO-END CRYPTOGRAPHY

BACKGROUND

Communication systems can utilize encryption to ensure privacy or security for users of the communication system. In some implementations, a security key, or security key pair, is generated by one or more device communicating over the communication system. The security key may be used to encrypt or decrypt messages transmitted over the communication system. When securing messages transmitted over the communication system, it may be desirable for the security key to be changed periodically. For example, where there is a risk that an intermediary device, such as an eavesdropper accessing a message transmitted through a wireless network, may guess or calculate the security key, changing the security key may limit the amount of a message the eavesdropper can decrypt.

BRIEF DESCRIPTION OF THE DRAWINGS

Embodiments of various inventive features will now be described with reference to the following drawings. Throughout the drawings, reference numbers may be reused to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

The present disclosure relates to using changes in active speaker identity during a multi-participant conversation as a basis for changing cryptographic key information used to encrypt conversation data (or portions thereof).

Some conventional systems allow for secure communication between networked devices, such as smartphones and laptops, for example by encrypting messages on the source device and transmitting the encrypted message across a network to be decrypted by the receiving device. The encryption of a message from the source device at transmission until receipt by the receiving device may be known as end-to-end encryption. Currently, many systems will encrypt the message according to randomly generated cryptographic key data (also referred to as "key data" for brevity), such as by a symmetric or asymmetric key encryption algorithm (e.g., Rivest-Shamir-Adleman (RSA) or public key infrastructure (PKI) encryption.

Conventional systems using one item or set of key data throughout an entire communication, or across multiple communications, may be vulnerable to an eavesdropper detecting or determining the key data, allowing the eavesdropper to decrypt some or all of the messages of the communication, creating a significant security risk for such systems. Some existing systems, addressing the vulnerability described here, may change cryptographic key data at regular or random intervals (also referred to as "rotating" the key data) so that an eavesdropper who gains access to key data may only be able to decrypt a subset of the total messages of the communication. However, when rotation of the key data occurs at regular intervals, an eavesdropper may still be able to gain access to the messages of the communication by determining the interval at which the key data rotates and potentially using this knowledge to determine the key data used to encrypt messages at each rotation. Knowing the timing of a key data rotation of the communication system allows the eavesdropper to more easily determine when a calculation must be made to determine the current key data being used to encrypt messages.

Some aspects of the present disclosure address some or all of the issues noted above, among others, by triggering rotation of cryptographic key data—used during an audio or multimedia conversation-based at least in part on detection of a change in the current active speaker. For example, a multi-participant audio or multimedia conversation may be managed using a multi-device communication system in which the participating devices exchange conversation data (e.g., audio data, audio/video data, etc.) over a network. The conversation data is exchanged in encrypted form for security purposes, and the key data used for cryptographic operations on the conversation data may be rotated to provide a greater degree security than use of substantially static key data for the entirety of a conversation. In contrast to scheduled or metronomic rotation of cryptographic key data, triggering rotation of cryptographic key data based on detection of a change in the current active speaker can result in a substantially random timing of key data rotation. Advantageously, substantially random timing of key data rotation can make it difficult or impossible for an eavesdropper to identify a pattern in key data rotation, because the pattern is dynamic and depends at least in part on the real-time actions of conversation participants, which can be unpredictable.

With reference to an illustrative embodiment, a conversation involving two or more user devices arranged as a communication system for purposes of conducting the conversation may involve capture of audio by one user device (or by a microphone or other audio sensor associated with one user device), encryption of the audio, and transmission of the encrypted audio to one or more other devices. The other user devices may perform similar operations to provide for multi-participant communication during the conversation. The key data used to communicate during an initial stage of the conversation may be agreed upon by the user devices using any of a variety of standard key data exchange or other handshake protocols. During the course of the conversation, the current active speaker may be determined by a speaker identification system operating on a user device. For example, a user device may compare information representing known speakers (e.g., an embedding generated by a machine-learning model) to the current audio information received by the communication system (e.g., by a microphone of a user smartphone transmitting voice data over the communication system). A user device of the communication system may then rotate the key data used to, for example, encrypt messages (e.g., the voice communication information) for transmission via the communication system. The new or updated key data used after a rotation may be generated based on the information representing the currently active speaker as determined by the speaker identification system of the user device. For example, the key data may be a speaker embedding used to identify the current active speaker, key data that is assigned to or otherwise associated with the current active speaker (e.g., using a code book or dictionary), key data generated using an algorithm and the speaker embedding as a seed, or using some other key data generation or identification method that is tied at least in part to the identity of the current active speaker.

In some embodiments, audio data associated with a conversation is received by a user device, for example a personal device such as a smartphone, tablet, laptop, or personal computer. The audio data may be captured by the user device through a microphone. Alternatively, the audio data may be received from another device through the user device's network connection. The audio data may then be processed using a speaker identification model. The speaker identification model may be configured to generate an encoded representation of the audio and/or active speaker therein. Such an encoded representation may be referred to as an embedding.

As used herein, the term embedding is used in accordance with its normal and customary meaning in the art, and refers to a point or vector in an embedding space to which an audio signal or a feature-based representation of an audio signal may be mapped. For example, an embedding may be generated in the form of an n-dimensional vector, where n is the number of dimensions in the embedding space. Embeddings may be generated by a model (e.g., an artificial neural network or other deep learning model) trained to map audio or features extracted from audio into the embedding space. In the case of embeddings for speaker identification, the model may be referred to as a speaker identification model.

As used herein, the term rotation is used in accordance with its normal and customary meaning in the art of cryptography, and refers to the changing of some or all of the values used by a user device or other computing system to encrypt or decrypt information transmitted throughout a system.

To identify an active speaker in an audio signal corresponding to a multi-participant conversation, a speaker identification system may generate an inference embedding of a portion of audio from the conversation (e.g., one or more frames of audio data) using a speaker identification model. This inference embedding of conversation audio in which an active speaker is to be identified may also be referred to as a conversation embedding. The speaker identification system may compare the conversation embedding to a set of speaker embeddings for speakers that may be identified as the active speaker. Each speaker embedding of the set of speaker embeddings may be associated with individual participants in the conversation. The speaker embeddings may be pre-generated (e.g., prior to the start of the conversation, or prior to generation of the conversation embedding) for the potential active speakers using the same model or a similar speaker identification model as is used for generating the conversation embedding. As a result of the comparison, a set of values, such as correlation values, indicating the most likely speaker among the set of known speaker embeddings may be generated. For example, a Euclidian distance or cosine similarity may be determined for each speaker embedding with respect to the conversation embedding. The speaker embedding that is closest to the conversation embedding based on the determined distances may be identified as the speaker embedding of the most likely active speaker.

In some embodiments, the speaker identification system may be a subsystem or module of a user computing system, such as user device. The speaker embeddings that the speaker identification system uses may be obtained (e.g., from a server) prior to commencement of the multi-participant conversation. For example, if a multi-participant conversation occurs as part of a scheduled meeting, then the speaker identification system may obtain a set of speaker embeddings including individual speaker embeddings for each expected participant identified in a roster for the scheduled meeting.

The user device may use results of the most likely active speaker determination to rotate a cryptographic key or other cryptographic information used for encryption or decryption of messages transmitted over the communication system. For example, the user device may rotate a cryptographic key value each time a change in the active speaker identity is determined. Additionally, the user device may maintain a threshold time after which, if no change in the active speaker identity is detected, the cryptographic key value will be changed. The new cryptographic key, in some examples, will be generated using information associated with the active speaker identity (e.g., the speaker embedding associated with the active speaker). In alternative examples, the new cryptographic key will be generated based on a preset or randomized value of the user device.

As will be appreciated by one of skill in the art, in light of the present disclosure, the embodiments disclosed herein improve the ability of computing systems to efficiently ensure the security of information transmitted between computing devices during multi-participant communication sessions. Moreover, the presently disclosed embodiments address technical problems inherent within computing systems; specifically, the need to rotate cryptographic information, the need for the rotation of cryptographic information to be performed in a secure manner, the need for rotation of cryptographic information to be unpredictable to a maintain privacy from a party not authorized to access communication information, and the like. These technical problems are addressed by the various technical solutions described herein, including the application of active speaker identification to the rotation and generation of cryptographic information (e.g., the generation and replacement of public key information for a communication secured by public key cryptography). Thus, the present disclosure represents an improvement to computing systems participating in or managing multi-participant communication sessions, and computing systems in general.

Various aspects of the disclosure will be described with regard to certain examples and embodiments, which are intended to illustrate but not limit the disclosure. Although aspects of some embodiments described in the disclosure will focus, for the purpose of illustration, on particular examples of cryptographic algorithms, cryptographic key data types, machine learning models, and the like, the examples are illustrative only and are not intended to be limiting. In some embodiments, the techniques described herein may be applied to additional or alternative types of cryptographic algorithms, cryptographic key data types, machine learning models, and the like. Additionally, any feature used in any embodiment described herein may be used in any combination with any other feature or in any other embodiment, without limitation.

Example Voice Assisted End-to-End Cryptography

Figure 1A:
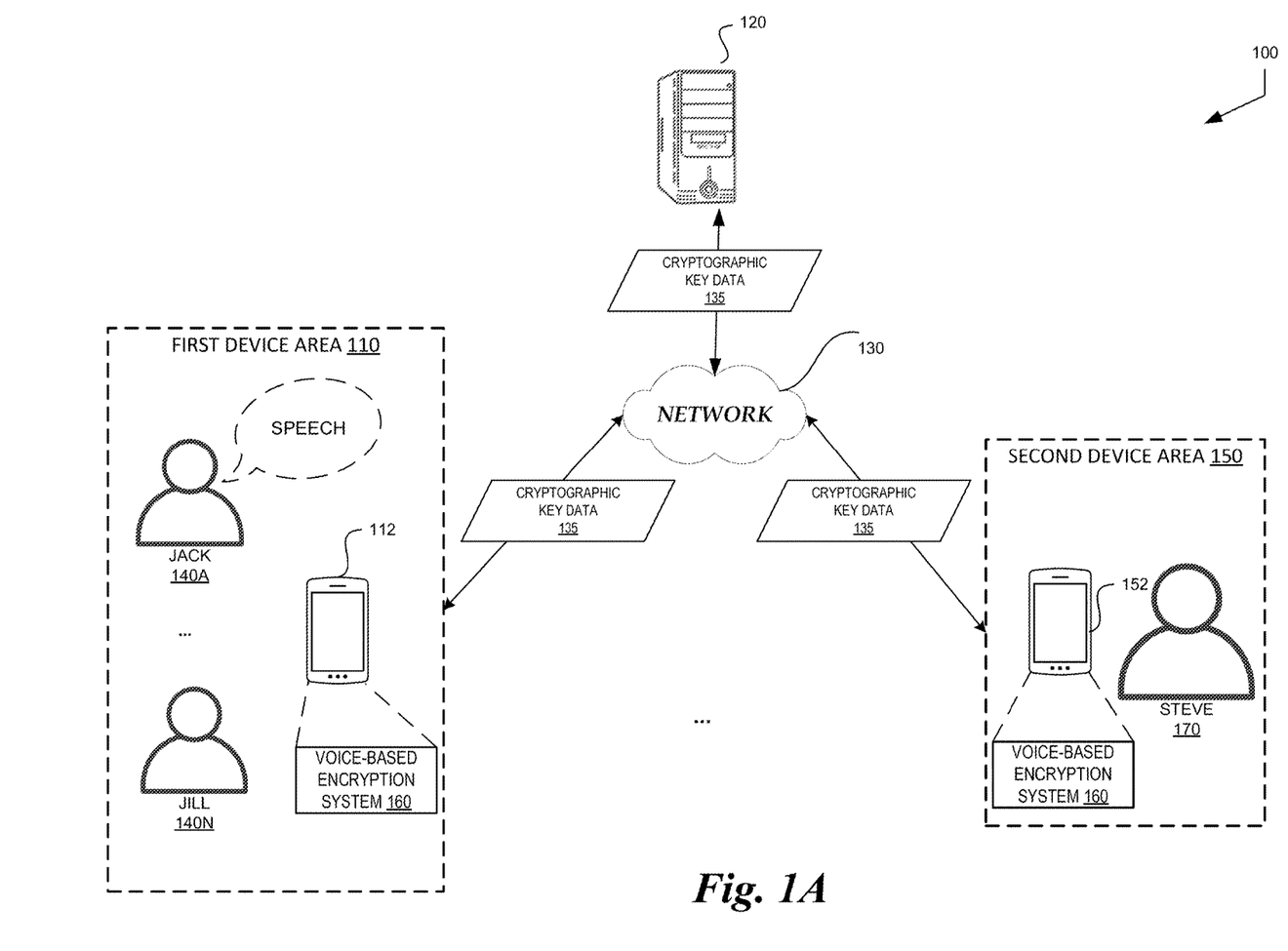
FIG. 1A is a diagram of illustrative data flows within a communication system implementing voice identification assisted end-to-end cryptography according to some embodiments.

With reference to an illustrative embodiment, FIG. 1 shows an example voice identification-based encrypted communication system 100. The voice identification-based encrypted communication system 100 may comprise one or more potential speakers 140A-140N and a first communication device 112 in a first device area 110, a network 130, a communication management system 120, and a second communication device 152 for one or more additional potential speakers 170 located in a second device area 150. The voice identification-based encrypted communication system 100 may transmit cryptographic key data 135 between components of the voice identification-based encrypted communication system 100. The cryptographic key data 135 may, in some examples, be transmitted by the network 130.

In some embodiments, the voice identification-based encrypted communication system 100 may be incorporated into a communication service used to facilitate a multi-participant audio conversation. An audio conversation may refer to a communication session comprising audio information alone, or a communication session comprising audio information and other information associated with the communication session (e.g., video information for an audio-video conferencing application comprising both an audio and video component, geographic or location information, time information, etc.). The audio conversation information may be encrypted in whole or in part by the voice-identification-based encrypted communication system 100. The communication service may, for example, be a peer-to-peer (P2P) communication service (e.g., a WebRTC-based communication service). In alternative embodiments, the communication service may be a hosted communication solution facilitated by a network-based service provider. In some examples, the hosted communication solution may direct information of the audio conversation through one or more servers, networks, or computing devices facilitating the hosted communication solution (e.g., information may be routed from the first communication device 112 to a central server of the hosted communication provider, such as a communication management system 120, and then be routed from the central server to the second communication device 152). Additionally, the communication service may comprise a voice-based encryption system 160 or additional software elements operating on any of the devices facilitating the communication service (e.g., a video-conferencing smartphone application). The additional software elements may be provided to allow for the use of the communication service.

In some embodiments, the first communication device 112 and the second communication device 152 may each comprise a voice-based encryption system 160. An example voice-based encryption system 160 is described in further detail in FIG. 1B.

Additionally, the first communication device 112 may be one of a first plurality of communication devices located in the first device area 110. The second communication device 152 may be on of a second plurality of communication devices located in the second device area 150. The first plurality of communication devices and the second plurality of communication devices may be the same type of communication devices (e.g., each device may be a smartphone). Alternatively, the first plurality of communication devices and the second plurality of communication devices may be different communication devices (e.g., the first plurality of devices may be smartphones, and the second communication device 152 may be a laptop). Alternatively, first plurality of communication devices, and the second plurality of communication devices may comprise any combination of different device types (e.g., the first plurality of communication devices may comprise a laptop computing device, a smartphone, and a tablet computing device).

In some embodiments, the first communication device 112 and the second communication device 152 may each comprise a microphone or other sensor for detecting sound information, a network communication component, a memory for storing the voice-based encryption system 160, and a processing unit configured to execute instructions stored in the memory.

As will be described in more detail in relation to FIG. 1B below, the voice-based encryption system 160 of the first communication device 112 and the second communication device 152 may perform the actions of generating initial cryptographic key data, detecting an active speaker, identifying the active speaker (e.g., first speaker 140A), generating new cryptographic key data, and managing cryptographic data. In some embodiments, the voice-based encryption system 160 may additionally encrypt or decrypt data transmitted or received over the voice identification-based encrypted communication system 100. In alternative embodiments, another component of the first communication device 112 and the second communication device 152 may perform the encryption and decryption of such data.

In some embodiments, the communication management system 120 is a server configured to manage secure communications over the voice identification-based encrypted communication system 100. The communication management system 120 may manage a central set of speaker embeddings used to identify an active speaker by the voice-based encryption system 160 of the various devices in communication with the communication management system 120. The communication management system 120 may additionally provide central timing information and manage the exchange of cryptographic key data 135 between the other components of the voice identification-based encrypted communication system 100 via the network 130.

In alternative embodiments, a separate communication management system 120 may not be used, and actions described herein with respect to the communication management system 120 may instead be performed by the first communication device 112, the second communication device 152, or another component of the voice identification-based encrypted communication system 100.

The network 130 may be the internet, a local area network, or any other network allowing for communication between various components of the voice identification-based encrypted communication system 100. Components of the voice identification-based encrypted communication system 100 may communicate over the network 130 through a wired or wireless connection (e.g., Bluetooth, WiFi, ethernet, etc.).

In some embodiments, cryptographic key data 135 is shared between the components of the voice identification-based encrypted communication system 100, for example via the network 130. The cryptographic key data 135 may comprise, for example, initial cryptographic key data, updated or new cryptographic key data generated by, for example, the voice-based encryption system 160 (e.g., cryptographic key data generated in response to a change in the active speaker), timing information or acknowledgement information indicating synchronization of the current cryptographic key data between the components of the voice identification-based encrypted communication system 100 (e.g., an acknowledgement sent from the second communication device 152 to indicate to the first communication device 112 that new cryptographic key data has been received), or any other information relevant to the generation, use, management, and termination of cryptographic key data by components of the voice identification-based encrypted communication system 100. In some embodiments, the cryptographic key data 135 may comprise public key data of a public-private key pair. (e.g., cryptographic key data using the RSA algorithm). Alternatively, the cryptographic key data 135 may comprise data used in implementing a shared secret cryptographic algorithm (e.g., used in implementing a Diffie-Hellman key exchange algorithm). Alternatively, the cryptographic key data 135 may be secret key data used in a symmetric-key encryption algorithm. Alternatively, the cryptographic key data 135 may be a secret or public value used in a cryptographic algorithm that does not implement key-based encryption to encrypt or decrypt data. Additionally, while the cryptographic key data 135 references key data, the voice identification-based encrypted communication system 100 may be used by systems which do not implement key-based cryptography, and in such cases the cryptographic key data 135 may be any information related to the implementation, use, and management of the non-key based cryptographic system.

Figure 1B:
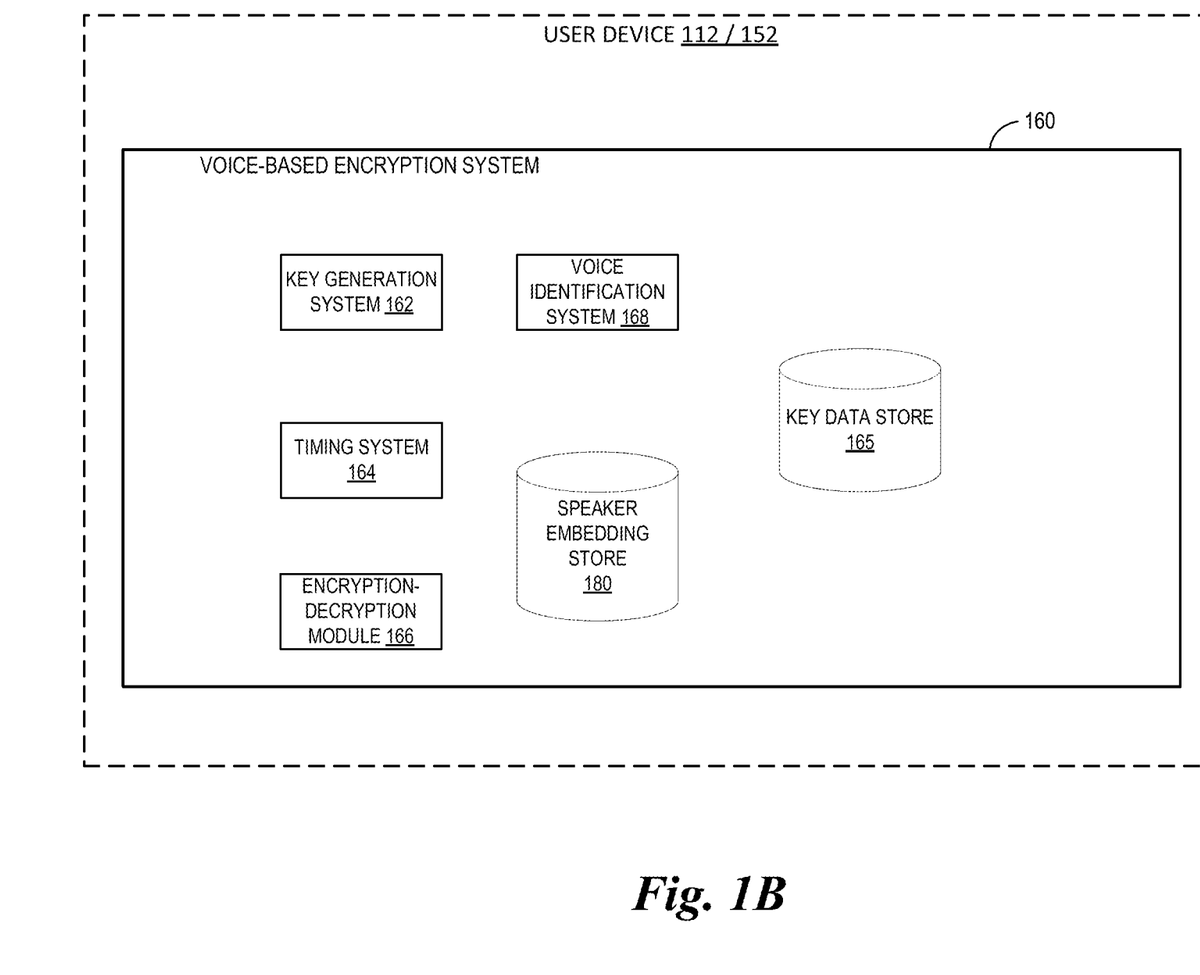
FIG. 1B is a diagram of illustrative data flows within a voice-based encryption system of the communication system.

FIG. 1B illustrates an example voice-based encryption system 160. In some embodiments, the voice-based encryption system 160 may comprise a key generation system 162, a timing system 164, an encryption-decryption module 166, a voice-identification system 168, and various data stores such as a key data store 165, a speaker embedding store 180, or the like.

In some embodiments, the voice-identification system 168 comprises a system for generating sound embeddings from received sound information (e.g., a configurable neural network, a pre-trained model, etc.), and in some configurations a system for comparing speaker embeddings to the generated sound embedding to identify an active speaker identity. In alternative embodiments, the voice-identification system 168 may only generate sound embeddings, and the comparison between the generated sound embedding and the speaker embeddings may be performed by another component of the voice-based encryption system 160. In some embodiments, the model used to generate sound embeddings may be the same model which was used to generate the speaker embeddings identifying individual speakers (e.g., the speaker embeddings stored in the speaker embedding store 180) or a different model configured to generate sound embeddings which may be compared to the speaker embeddings. Additionally, different models may be used by the voice-identification system 168 of the first communication device 112 and the second communication device 152, for example based on different processing and memory resources available to the first communication device 112 and the second communication device 152. Example systems and methods for active speaker identification are described in commonly-owned U.S. patent application Ser. No. 18/187,619, filed Mar. 21, 2023 and titled "SET-BASED ACTIVE SPEAKER DETECTION," the contents of which are incorporated by reference herein and made part of this specification.

In some embodiments, the key generation system 162 generates cryptographic key data 135 for the voice-based encryption system 160. The key generation system 162 may generate initial cryptographic keys used by the voice-based encryption system 160 before an initial speaker has been identified. Further, the key generation system 162 may generate updated or new cryptographic keys for the voice-based encryption system 160 when an active speaker is identified, when a change in active speaker is identified, when a time from the last new cryptographic key generation operation exceeds a threshold time, or in response to another event.

With reference to an illustrative example, when an active speaker has not been identified (e.g., at the beginning of a communication session, during a period of silence or non-speech noise, when an unknown speaker is speaking, etc.), the key generation system 162 may generate cryptographic keys based on non-active-speaker-based events or data, such as timing information (e.g., a current time received from the timing system 164), a random number generated by the key generation system 162, a random number received from another component of the device containing the voice-based encryption system 160, or any other value which the key generation system 162 may request or access. When an active-speaker-based trigger event occurs (including but not limited to when an active has been identified or when a change in active speaker has been detected, for example by the voice-identification system 168), the key generation system 162 may generate new cryptographic key data using some or all of the speaker embedding information associated with the identified active speaker. Alternatively, when an active-speaker-based trigger event has been detected, the key generation system 162 may use the embedding of the current sound information which has been determined to contain the voice of the active speaker (e.g., by the voice-identification system 168) to generate new cryptographic key data. In embodiments of the voice identification-based encrypted communication system 100 where a non-key-based cryptography system is used to protect information, the key generation system 162 may generate any cryptographic information used by the non-key-based cryptography system (e.g., salt values for a salted hash cryptography system).

In some embodiments, the timing system 164 may be configured to generate independent timing information (e.g., by measuring the oscillations of a crystal). Alternatively, the timing system 164 may be configured to synchronize timing information received from a communication device comprising the voice-based encryption system 160 (e.g., first communication device 112) with timing information of other components of the communication management system 120. Additionally, the timing system 164 may be configured to store a time when the cryptographic key has been changed, or rotated, and determine a time since last key rotation to be compared to a threshold time. The timing system 164 may then determine when the threshold time has been exceeded and instruct the key generation system 162 to generate a new cryptographic key data. Additionally, timing information generated by the timing system 164 may be used, for example, to enable to rotation of cryptographic keys used by the voice identification-based encrypted communication system 100.

In some embodiments, the encryption-decryption module 166 may encrypt and decrypt messages transmitted and received by the voice-based encryption system 160. In some embodiments, the encryption-decryption module 166 may use cryptographic key information, for example a public portion of key information stored in the key data store 165, to encrypt a message for transmission over the voice identification-based encrypted communication system 100. In some embodiments, the encryption-decryption module 166 may use cryptographic key information, for example cryptographic key information stored in the key data store 165 to decrypt messages received by the voice-based encryption system 160.

In some embodiments, such as where asymmetric key cryptography is used, the voice-based encryption system 160 may comprise the key data store 165. The key data store 165 may, in an asymmetric key system, store private key values and public key values. In alternative embodiments, such as embodiments using symmetric key encryption, the key data store 165 may be used to store the symmetric key information. In alternative embodiments where a non-key-based encryption system is used, the key data store 165 may be used to store cryptographic information (e.g., salt values) used to encrypt or decrypt messages transmitted via the voice identification-based encrypted communication system 100.

Example Continuous Communication Encryption Timeline

Figure 2A:
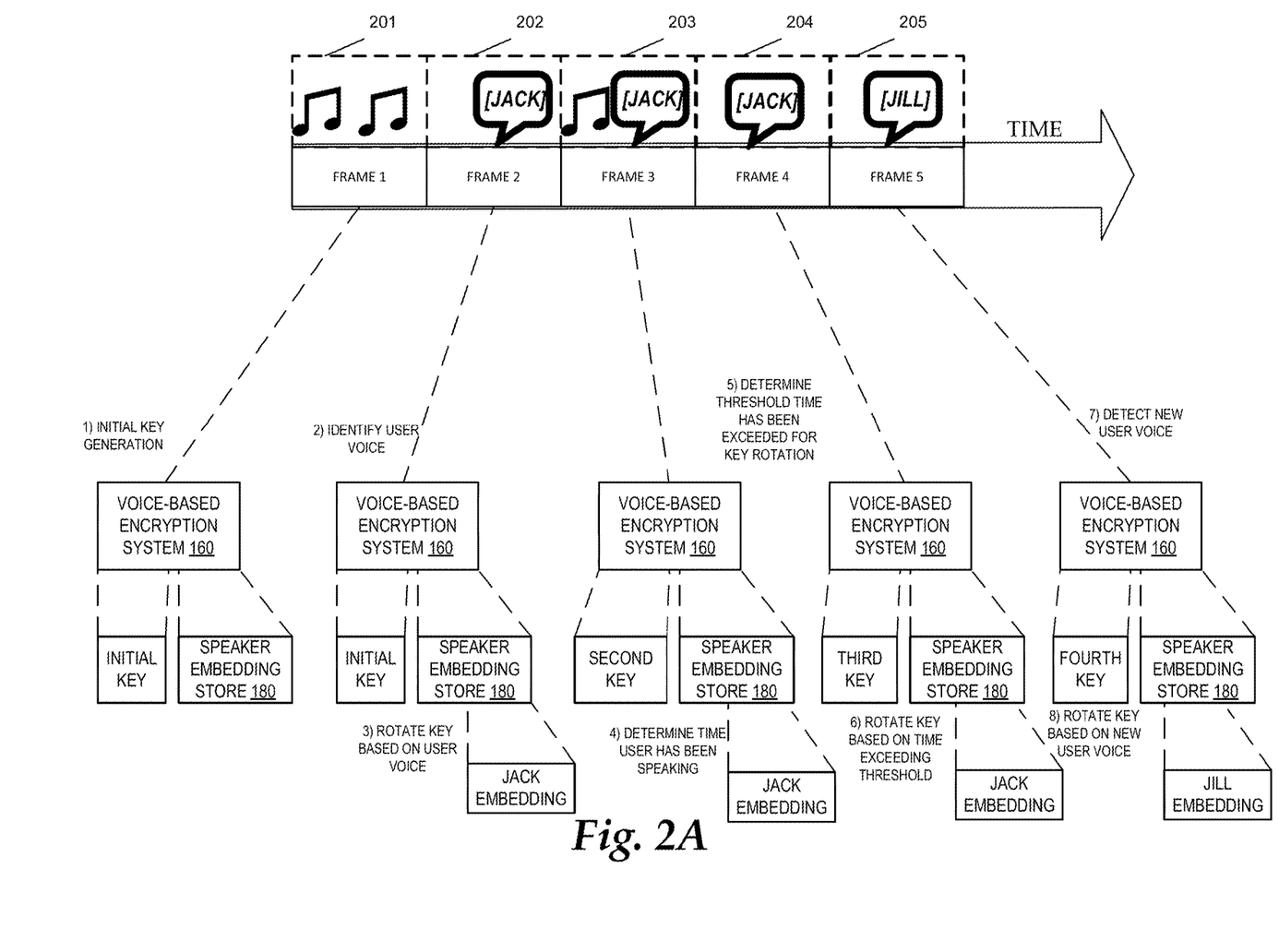
FIG. 2A is an illustrative timeline of rotating cryptographic key data based on voice identification according to some embodiments.
Figure 2B:
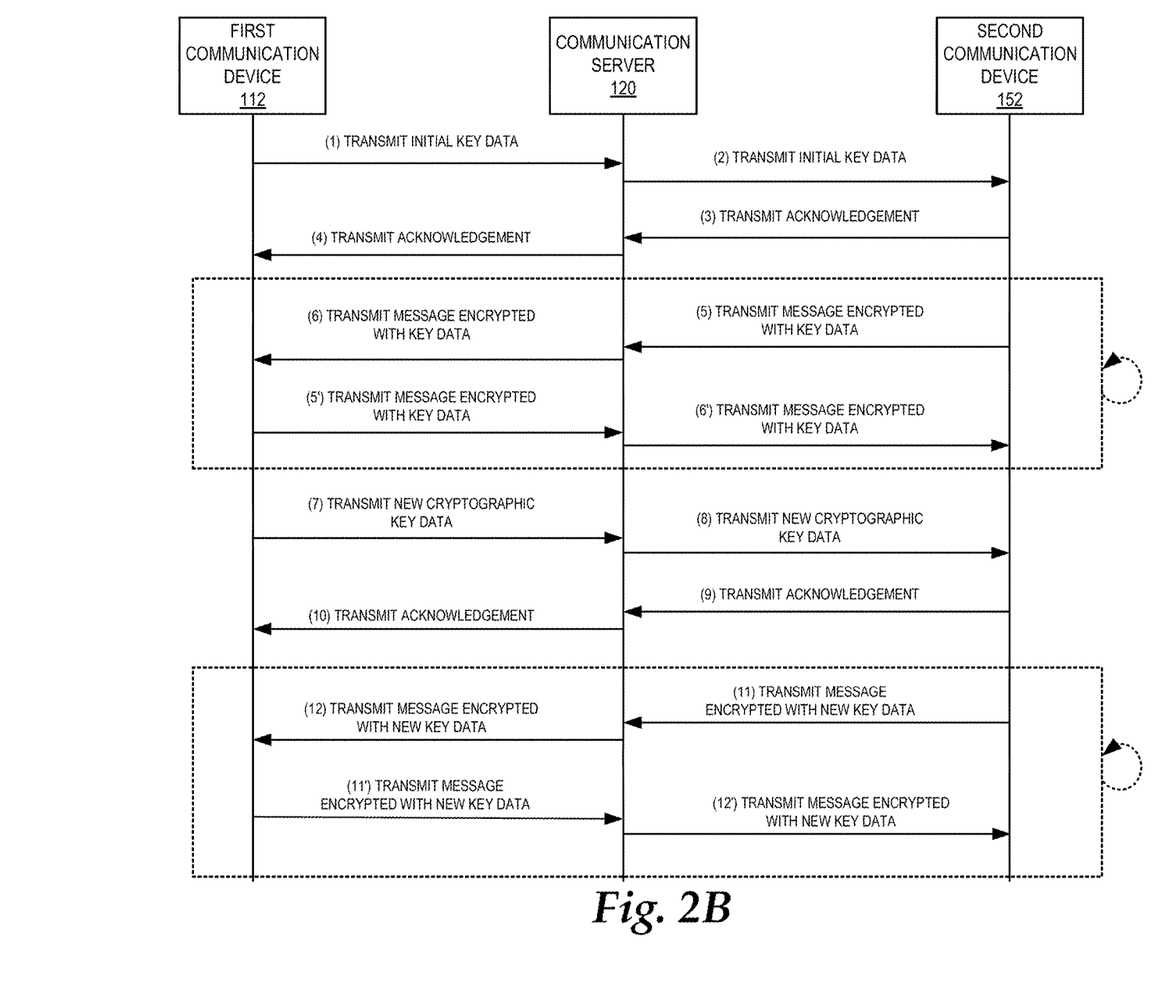
FIG. 2B is an illustrative signal transmission timeline of encryption information for a communication system implementing voice identification assisted end-to-end cryptography according to some embodiments.

FIG. 2A illustrates an example timeline for a system rotating cryptographic key data based on voice identification, and is further described in reference to FIG. 2B which illustrates an example signal transmission timeline of encryption information for a communication system implementing voice identification assisted end-to-end cryptography using a public-key cryptography method.

In some embodiments, audio input to the first communication device 112 may be divided into frames of audio. A frame of audio may be defined as a fixed interval of time (e.g., 1 second, 100 milliseconds, 5 milliseconds, etc.) for which audio information is received by an audio input of the first communication device 112. Where audio data is not received by the first communication device 112 at the same rate as frames are generated (e.g., three seconds of audio information are received by the voice-based encryption system 160 from the first communication device 112 where a frame length is one second) the received audio data may be divided into frames for processing. The division of the audio input into frames may be performed prior to the voice-based encryption system 160 receiving the audio data from the first communication device 112. In some embodiments, the division of the audio input into frames may be performed by the voice-based encryption system 160, or another component of the first communication device 112. Where the audio data is received from another device of the voice identification-based encrypted communication system 100 by the first communication device 112, the audio data may be received as frames. In some implementations, the voice-based encryption system 160 may divide audio data into frames of different lengths, and in some implementations the audio data may not be divided into frames.

In the present illustrative example, the voice-based encryption system 160 receives audio data over time (e.g., conversation audio data), for example by a microphone of the first communication device 112. The received audio data may be divided into frames (e.g., by the voice-based encryption system 160), here a first frame 201 through a fifth frame 205. The frames of audio data are generated, in this example, in chronological order. In alternative examples, the frames of audio data may be received or generated out of chronological order and stored, for example, in a buffer until a set number of frames are received at which point the frames may be ordered for further processing. Alternatively, frames of audio data may be generated by another component of the voice identification-based encrypted communication system 100, for example the communication management system 120, and transmitted to the first communication device 112 for further processing by the voice-based encryption system 160. In additional embodiments, the audio data may be received by a second communication device 152 of the voice identification-based encrypted communication system 100, and the audio data may then be transmitted by the second communication device 152 to the communication management system 120 which may then transmit the audio data, in whole or as frames of audio data, to the first communication device 112. Alternatively, the audio data received by second communication device 152 may be transmitted directly to the first communication device 112 in whole or as frames of audio data.

At the beginning of the present illustrative example, which may correspond to the beginning of a secure multi-participant communication session, a bootstrapping process may be performed by which the first communication device 112 establishes a cryptographically secure communication with one or more other communication devices, such as second communication device 152. For example, the voice-based encryption system 160 generates an initial cryptographic key data for encrypting communications sent from or received by the first communication device 112. The initial cryptographic key data may be generated by the key generation system 162 of the voice-based encryption system 160 according to any algorithm used to cryptographically secure communication data (e.g., symmetric-key algorithms, asymmetric-key algorithms, salted hash algorithms, etc.). A seed value may be used to generate the initial cryptographic key data. The seed value may be determined from, for example, an internal clock value of the voice-based encryption system 160 or first communication device 112, a value of a random number generator component of the first communication device 112, or from any other value accessible to the voice-based encryption system 160. The initial cryptographic key data may alternatively be a fixed value for the communication management system 120 and may be stored in the key data store 165, or in any other component of the voice-based encryption system 160.

FIG. 2B shows example communications between a first communication device 112, a second communication device 152, and optionally a communication management system 120 during a multi-participant communication session. Although specific examples of cryptographic and key exchange operations will be described, the examples are provided for purposes of illustration only, and are not intended to be limiting, required, or exhaustive. In some embodiments, additional, fewer, or alternative operations may be performed while still incorporating the advantages of active-speaker-based triggering of cryptographic key data rotation. For example, active-speaker-based triggering of cryptographic key data rotation may be used with public key infrastructure, Diffie-Hellman key exchange, or the like.

In the illustrative example shown in FIG. 2B, when the initial cryptographic key data is generated, the voice-based encryption system 160 of the first communication device 112 transmits the initial cryptographic key data, here public key data, to the communication management system 120 at (1). The message may include key data generated by or otherwise associated with the second communication device 152 (e.g., a public key of the second communication device 152, cryptographic key data for performing a Diffie-Hellman key exchange protocol). The initial cryptographic key data is then transmitted from the communication management system 120 to the second communication device 152 at (2). In some implementations, the initial cryptographic key data will be transmitted directly from the first communication device 112 to the second communication device 152 via the network 130 (e.g., there may be no communication management system 120, or certain communications between the first communication device 112 and second communication device 152 may not go through the communication management system 120). When the second communication device 152 has received the initial cryptographic key data, an acknowledgement may be sent to the first communication device 112 via the communication management system 120 at (3) and (4). Alternatively, the acknowledgement may be transmitted directly to the first communication device 112 via the network 130. If the first communication device 112 does not receive the acknowledgement from the second communication device 152, the first communication device 112 may retransmit the initial cryptographic key data to the communication management system 120 or the second communication device 152. Alternatively, the communication management system 120 may determine an acknowledgement has not been received and retransmit the initial cryptographic key data to the second communication device 152, repeating (2). The acknowledgement may be used to indicate to the first communication device 112 that incoming messages may now be decrypted according to a secret, or private, portion of the initial cryptographic key data stored by the first communication device 112 and not shared with other components of the voice identification-based encrypted communication system 100.

The second communication device 152 may then encrypt a message using the initial cryptographic key data, and transmit the encrypted message to the communication management system 120 at (5). In some embodiments the message may be or include encrypted audio data generated by a microphone of the second communication device 152. The communication management system 120 may then transmit the encrypted message to the first communication device 112 at (6). The transmission of the encrypted message to the communication management system 120 and the transmission of the encrypted message to the first communication device 112 may be performed via the network 130. Alternatively, the encrypted message may be transmitted directly from the second communication device 152 to the first communication device 112, and the transmission may occur via the network 130. When the encrypted message is received by the first communication device 112 at (6), the first communication device 112 may decrypt the encrypted message to generate a decrypted message. The first communication device 112 may then present the decrypted message to a user of the first communication device 112 (e.g., by playing decrypted sound information on a speaker of the first communication device 112).

In addition, or alternatively, the first communication device 112 may encrypt a message using the initial cryptographic key data, and transmit the encrypted message to the communication management system 120 at (5'). In some embodiments the message may be or include encrypted audio data generated by a microphone of the first communication device 112. The communication management system 120 may then transmit the encrypted message to the second communication device 152 at (6'). The transmission of the encrypted message to the communication management system 120 and the transmission of the encrypted message to the second communication device 152 may be performed via the network 130. Alternatively, the encrypted message may be transmitted directly from the first communication device 112 to the second communication device 152, and the transmission may occur via the network 130. When the encrypted message is received by the second communication device 152 at (6'), the second communication device 152 may decrypt the encrypted message to generate a decrypted message. The second communication device 152 may then present the decrypted message to a user of the second communication device 152 (e.g., by playing decrypted sound information on a speaker of the second communication device 152).

In some embodiments, the interactions labeled (5), (6), (5'), and/or (6') may be performed and/or repeated any number of times, in any order, depending upon the conversation, before proceeding to the next illustrated operations.

Referring again to FIG. 2A, the first frame 201 of audio data is received from the first communication device 112 by the voice-based encryption system 160. Receiving the first frame 201 may occur prior to, after, or simultaneously with generation of the initial cryptographic key data by the voice-based encryption system 160. In this example, the first frame 201 comprises non-speech noise. In some implementations, when the voice-based encryption system 160 has not received voice data in the first frame 201, the voice-based encryption system 160 continues to use the initial cryptographic key data. In alternative implementations, the voice-based encryption system 160 may generate new cryptographic key information to preserve security of the voice identification-based encrypted communication system 100 until a speaker is detected (e.g., when the initial cryptographic key data is a fixed value).

Next, a second frame 202 of audio data is received by the voice-based encryption system 160. The second frame 202 comprises voice information for a portion of speech spoken by the first speaker 140A, here named "Jack." In the present example, the voice-based encryption system 160 may now determine that a user voice is contained in the second frame 202. Further, the voice-based encryption system 160 can identify the user voice and therefore the identity of the active speaker, for example using the voice-identification system 168 of the voice-based encryption system 160. Alternatively, another component of the first communication device 112 may identify the first speaker 140A. Alternatively, where audio data is received from another component of the voice identification-based encrypted communication system 100, the transmitting device or an intermediary device transmitting the audio data to the first communication device 112 may perform the active speaker identification.

The first speaker 140A speaking in the second frame 202 may be identified based on generating an audio embedding representing the audio information of the second frame 202 and comparing the embedding to the plurality of speaker embeddings stored in, for example, the speaker embedding store 180. In some implementations, the audio embedding may be generated by a machine learning model (e.g., a neural network) of the voice-identification system 168. The audio embedding may be compared to the plurality of speaker embeddings to generate a set of comparison values (e.g., cosine similarity between each speaker embedding and the audio embedding), and the highest comparison value may be determined to indicate the identity of the first speaker 140A. Identification of the active speaker may be performed through other methods capable of providing an identity of the first speaker 140A based on the received audio data, for example feature extraction prior to a comparison between the audio data and known speaker data may be performed.

When the first speaker 140A has been identified, the voice-based encryption system 160 generates a new cryptographic key data. In some embodiments, the new cryptographic key data may be generated, in whole or in part, based on voice information of the first speaker 140A. For example, the new cryptographic key data may be generated by using numerical values associated with an embedding representing the voice of the first speaker 140A (e.g., as a seed value or user secret). In some configurations, different portions of the embedding representing the voice of the first speaker 140A may be used to generate cryptographic key data. The selected portion of the embedding used to generate the cryptographic key data may be continuous from a start point, random, non-continuous but selected in a pre-determined pattern, or selected by any other method which provides a sufficient amount of data for the cryptographic key data to be generated.

Referring again to FIG. 2B, the new cryptographic key is transmitted from the first communication device 112 to the communication management system 120 at (7). In the present example, the cryptographic key is a public key having a corresponding private key which may be stored in the key data store 165 of the first communication device 112 (e.g., in an elliptic-curve cryptography implementation). In alternative embodiments, the cryptographic key may be any type of cryptographic data used to encrypt or decrypt message data transmitted between the first communication device 112 and the second communication device 152 (e.g., the cryptographic key used in symmetric key cryptography, key data associated with the key such as in Diffie-Hellman key exchange protocols, a hashing function or salt value in a hash-based encryption system, etc.). The communication management system 120 then transmits the new cryptographic key to the second communication device 152 at (8). As with previous steps discussed herein, the transmission to the communication management system 120 is optional, and the first communication device 112 may instead directly transmit the new cryptographic key to the second communication device 152, for example via the network 130. In some embodiments, the second communication device 152 may initiate transmission of a new cryptographic key to the first communication device 112 (e.g., when the second communication device 152 detects a change in active speaker based at least partly on sound information) instead of, or in addition to, the first communication device 112 initiating the transmission.

When the second communication device 152 has received the new cryptographic key data, the second communication device 152 sends an acknowledgement to the communication management system 120 at (9). The communication management system 120 then sends the acknowledgement to the first communication device 112 at (10). Similar to above, if the first communication device 112 does not receive the acknowledgement from the second communication device 152, the first communication device 112 may retransmit the new cryptographic key data to the communication management system 120 or the second communication device 152. Alternatively, the communication management system 120 may determine an acknowledgement has not been received and retransmit the new cryptographic key data to the second communication device 152. When the first communication device 112 has received the acknowledgement, the first communication device 112 may determine that any message received after the acknowledgement will be encrypted according to the new cryptographic key data. The first communication device 112 may then use a secret, or private, portion of the new cryptographic key data to decrypt subsequently received messages in this example implementing a public-key cryptography algorithm.

When the new cryptographic key data has been received by the second communication device 152 and an acknowledgment has been sent, the second communication device 152 may then encrypt a message with the new cryptographic key data. The second communication device 152 may then send the encrypted message to the communication management system 120 at (11). The communication management system 120 may then transmit the encrypted message to the first communication device 112 at (12). When the encrypted message is received by the first communication device 112 at (12), the first communication device 112 may decrypt the encrypted message to generate a decrypted message (e.g., to obtain decrypted sound information, decrypted video information, etc.). The first communication device 112 may then present the decrypted message to the user of the first communication device 112 (e.g., by presenting audio and video components of the decrypted message by a display and the speaker of the first communication device 112).

In addition, or alternatively, the first communication device 112 may encrypt a message with the new cryptographic key data. The first communication device 112 may then send the encrypted message to the communication management system 120 at (11'). The communication management system 120 may then transmit the encrypted message to the second communication device 152 at (12'). When the encrypted message is received by the second communication device 152 at (12'), the second communication device 152 may decrypt the encrypted message to generate a decrypted message. The second communication device 152 may then present the decrypted message to the user of the second communication device 152 (e.g., by presenting audio and video components of the decrypted message by a display and the speaker of the second communication device 152).

The transmission steps described herein in reference to FIG. 2B relating to the transmission, receipt, acknowledgement, and encryption of messages by the first communication device 112 and the second communication device 152 may continue to repeat for as long as the voice identification-based encrypted communication system 100 is in use and new cryptographic key data is generated for the communication. The transmission steps shown in FIG. 2B may also occur in reverse, as the second communication device 152 detects a change in the active speaker, and generates cryptographic key data (e.g., cryptographic key data 135) to encrypt and decrypt messages received by the second communication device 152.

Referring again to FIG. 2A, a third frame 203 of audio data is received by the voice-based encryption system 160, the third frame 203 comprising noise and speech information. The voice-based encryption system 160 determines that the active speaker continues to be first speaker 140A, and so the cryptographic key data may not be updated based on a new active speaker being detected. In some embodiments, if no change in active speaker has been detected and/or no other active-speaker-based trigger event has occurred, the voice-based encryption system 160 will then check the time elapsed since the last key rotation occurred, for example by using the timing system 164 of the voice-based encryption system 160. The timing system 164 may store a time the last key rotation occurred, for example by storing the current time on the system clock of the first communication device 112. Alternatively, the timing system 164 may comprise a separate clock, against which the time since the last key rotation can be determined. If the time elapsed since the last key rotation meets some threshold (e.g., n milliseconds, n seconds, n minutes, n clock cycles, n crystal oscillations, etc., where n is a static or configurable value), then the voice-based encryption system 160 can initiate a key rotation as described herein.

In the illustrated example, a fourth frame 204 of audio data is then received, and again the active speaker is the first speaker 140A. The voice-based encryption system 160 continues to determine the time since the last key rotation, and at the time of receiving the fourth frame 204 determines that the time since the last key rotation has exceeded a threshold value (e.g., 1 millisecond, 10 milliseconds, 1 second, 100 clock cycles, 100 crystal oscillations, etc.). Following the determination that a threshold time has been exceeded since the last cryptographic key data rotation, the voice-based encryption system 160 may generate new cryptographic key data. The new cryptographic key data generated based on exceeding a time threshold may be based on some or all of the data of the embedding associated with the first speaker 140A. Alternatively, the new cryptographic key data may be generated based on a current time, such as that stored by the timing system 164 of the voice-based encryption system 160, or the current time received from a clock of the first communication device 112. Alternatively, the new cryptographic key data may be generated based on a randomly generated value, a value stored in another component of the voice-based encryption system 160 or the first communication device 112, or using any other value accessible to the key generation system 162 of the voice-based encryption system 160.

In this example, following the rotation of the cryptographic key data, a fifth frame 205 of audio data is received by the voice-based encryption system 160. The fifth frame 205 comprises voice information for a second speaker 140N. In some embodiments, the voice-based encryption system 160 first determines which speaker is the active speaker (e.g., using a set of speaker embeddings as described herein). The voice-based encryption system 160 may then determine that the current active speaker (as determined using the new voice information) does not match the prior active speaker (the first speaker 140A), thus triggering a change in active speaker event. The determination and identification may be performed by the voice-identification system 168 of the voice-based encryption system 160, for example by comparing an embedding of the audio information of the fifth frame 205 to the speaker embeddings stored in the speaker embedding store 180, as described above.

When the change in active speaker associated with the audio data of the fifth frame 205 is identified, new cryptographic key data may be generated. As described previously, the new cryptographic key data may be generated based at least partly on some or all of the information of the speaker embedding associated with the new active speaker: the second speaker 140N. Alternatively, the new cryptographic key data may be generated based on a random number generated by a random number generator in communication with the voice-based encryption system 160. Alternatively, the new cryptographic key data may be generated based on a timing information, such as a current time information of the timing system 164 or of a clock of the first communication device 112.

Example Voice Assisted End-to-End Cryptography Routine

Figure 3:
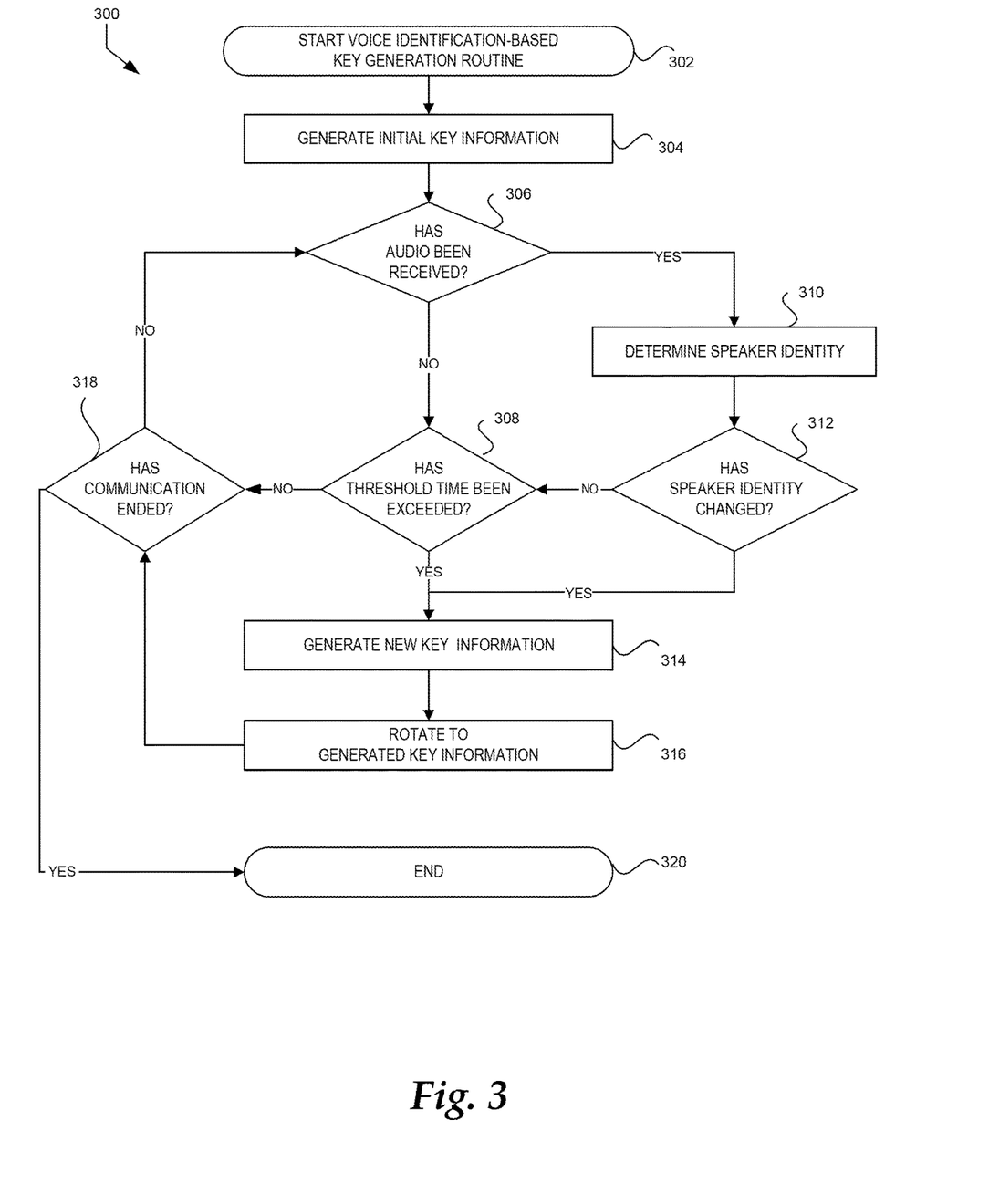
FIG. 3 is a flow diagram of an illustrative routine for encrypting communication using voice identification-based key generation according to some embodiments.

FIG. 3 illustrates example routine 300 for voice identification assisted end-to-end cryptography. The present illustrative example refers to the generation of cryptographic key values, but the routine 300 may be used to generate any type of cryptographic information useful to encrypt communication data. The routine 300 starts at block 302, and may be begin based on the initiation of a communication system of which the voice-based encryption system 160 is a component. Additionally, the routine 300 may be performed, for example, on a first communication device 112, on the communication management system 120, or on any device in communication with the voice identification-based encrypted communication system 100. In some implementations, a combination of devices may perform the action contained in a single block of the routine 300. In alternative implementations, different devices (e.g., the first communication device 112 or the communication management system 120) may perform actions associated with different blocks of the routine 300.

The routine 300 then moves to block 304, and initial cryptographic key information is generated. The initial cryptographic key information may be generated or otherwise determined based on a fixed value stored in the voice-based encryption system 160, such as in the key data store 165. Alternatively, the initial cryptographic key information may be generated or otherwise determined based on a randomly generated number, such as a number generated-using a pseudo-random number generator—by the voice-based encryption system 160, the first communication device 112, or any component of the voice identification-based encrypted communication system 100 in communication with the voice-based encryption system 160 configured to provide random number information. Alternatively, the initial cryptographic key information may be generated or otherwise determined based on timing information, such as information of the timing system 164, a clock of the first communication device 112, or a system clock associated with the voice identification-based encrypted communication system 100 (e.g., a system clock of the communication management system 120 used to maintain proper message timing of messages in the voice identification-based encrypted communication system 100). In some embodiments, as shown and described herein, the first communication device 112 may communicate with another device, such as the second communication device 152, to execute a handshake or bootstrap protocol for establishing a secure communication channel and generating initial cryptographic key information. When initial cryptographic key information has been generated, the routine 300 moves to block 306.

At block 306, a determination is made as to whether audio information has been received by the voice-based encryption system 160. The audio information may, for example, be received by a microphone of the first communication device 112 and transmitted internally to the voice-based encryption system 160 of the first communication device 112. Alternatively, the audio information may be received by the voice-based encryption system 160 of the first communication device 112 from another device of the voice identification-based encrypted communication system 100, such as the communication management system 120 or the second communication device 152. If audio information is received by the voice-based encryption system 160, the routine 300 moves to block 310. Alternatively, if audio information is not received by the voice-based encryption system 160, the routine 300 moves to block 308.

At block 310, where audio information has been received by the voice-based encryption system 160 at block 306, the voice-based encryption system 160 determines a speaker identity. The speaker identity may, for example, be determined by a voice-identification system 168 of the voice-based encryption system 160. For example, a machine-learning model of the voice-identification system 168 may generate an embedding from the received audio information. Further components of the voice-identification system 168 may then compare a set of speaker embeddings stored in the speaker embedding store 180 to the embedding generated by the machine learning model, for example by calculating a cosine similarity between each speaker embedding and the embedding generated from the received audio information. The speaker embedding determined to be most similar to the embedding generated from the received audio information may then be used to identify the active speaker. In some examples, a threshold similarity may be used to ensure that where no speaker embedding of the set of speaker embeddings has a similarity value exceeding the threshold, no active speaker is identified. In some examples, a speaker identity will be unknown, such as when only noise information is contained in the received audio data. In some examples, a speaker identity will be unknown because no speaker embedding stored in the speaker embedding store 180 is determined to match the received audio data, though the received audio data may contain speech information. When an active speaker identity is determined, or a determination is made the active speaker cannot be identified, the routine 300 moves to block 312.

At block 312, a determination is made as to whether the active speaker identity has changed. This determination may be made by comparing the speaker identity determined at block 310 to a previously known speaker identity (e.g., a speaker identity determined in a previous cycle of the routine 300). In the case where a speaker identity is determined to be unknown, the speaker identity may be determined to not have changed. Alternatively, where a speaker identity was previously known, and the active speaker identity determined at block 310 is determined to be unknown, the speaker identity may be considered to have changed. If the active speaker identity is determined to not have changed, then the routine 300 moves to block 308. If the active speaker identity is determined to have changed, the routine 300 moves to block 314.

At block 308, a determination is made as to whether a threshold time has been exceeded since the last change of the cryptographic key information occurred. For example, the timing system 164 of the voice-based encryption system 160 may compare a recorded time when the cryptographic key information was last changed to the current time as determined by the timing system 164. Alternatively, the timing system 164 may request a time from the system clock of the first communication device 112 each time the cryptographic key information is changed, and use the received time to determine the current time. Alternatively, the timing system 164 may request a time from the communication management system 120 or another component of the voice identification-based encrypted communication system 100 capable of providing timing information each time the cryptographic key information of the voice-based encryption system 160 is changed, and use the received time to determine when the change of cryptographic key information occurs. The threshold time used may be a fixed value. Alternatively, the threshold time may be variable, for example the threshold time may change based on the security context associated with the use of the voice identification-based encrypted communication system 100 (e.g., the threshold time may be shorter in a security context where the communication is considered to be highly sensitive such as when used by a government agency or a medical facility). Alternatively, the threshold time may be variable within a range, or randomized. If the threshold time since the last time the cryptographic key information was changed has not been exceeded, the routine 300 moves to block 318. If the threshold time since the cryptographic key information was changed has been exceeded, then the routine 300 moves to block 314.

At block 314, a new cryptographic key information is generated or otherwise determined by the voice-based encryption system 160. The new cryptographic key information may be generated or otherwise determined based on a speaker embedding information associated with an active speaker determined at block 310. For example, the speaker embedding for the active speaker stored in the speaker embedding store 180. Alternatively, the new cryptographic key information may be generated or otherwise determined based on a random number value, such as a number generated-using a pseudo-random number generator—by the voice-based encryption system 160, a component of the first communication device 112, or another component of the voice identification-based encrypted communication system 100 from which a random number value is received by the voice-based encryption system 160. Alternatively, the new cryptographic key information may be generated or otherwise determined based on a timing information, for example the timing information of the timing system 164. When a new cryptographic information is generated, the routine 300 moves to block 316.

At block 316, the cryptographic key information is rotated, that is the prior cryptographic key information is replaced by the new cryptographic key information for subsequent communication. Rotation of cryptographic key information may occur as described previously in reference to FIG. 2B, in particular step 7 through step 10 of FIG. 2B. In some embodiments, the previous cryptographic key may be destroyed. Alternatively, the previous cryptographic key may be stored by the voice-based encryption system 160, such as in the key data store 165. Storing previous cryptographic key information may be useful in scenarios where communication errors interfere with transition from the previous cryptographic key information to the new cryptographic key information. When the cryptographic key information has been rotated, the routine 300 moves to block 318.

At block 318, a determination is made as to whether the communication occurring over the voice identification-based encrypted communication system 100 has ended. If the communication continues, then the routine 300 returns to block 306 and the routine 300 repeats from there. Alternatively, if the communication has ended, the routine 300 moves to block 320 and ends.

Execution Environment

Figure 4:
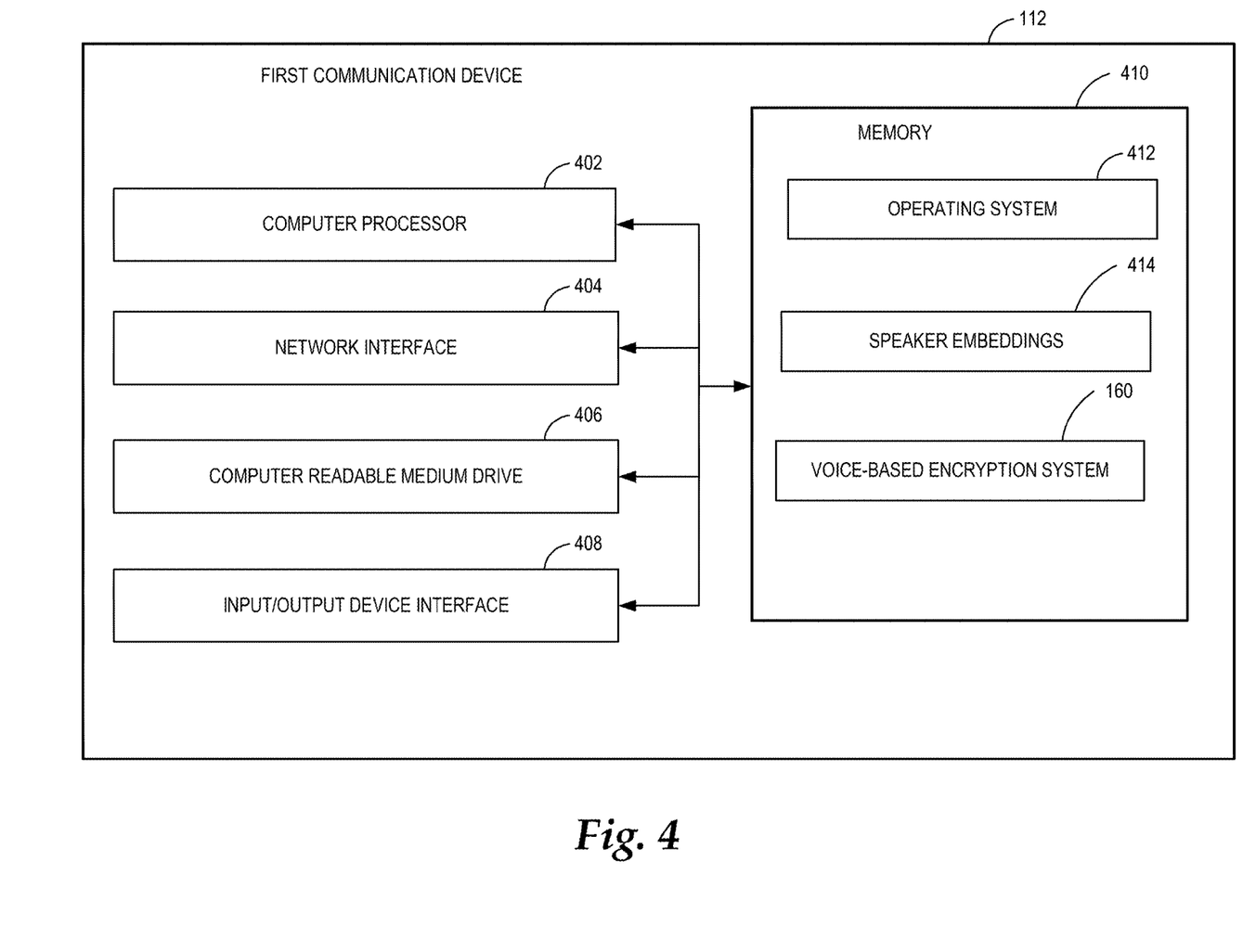
FIG. 4 is a block diagram of an illustrative computing device configured to implement aspects of the present disclosure according to some embodiments.

FIG. 4 illustrates various components of an example first communication device 112 configured to implement various functionality described herein.

In some embodiments, the first communication device 112 may be implemented using any of a variety of computing devices, such as server computing devices, desktop computing devices, personal computing devices, mobile computing devices, mainframe computing devices, mid-range computing devices, host computing devices, or some combination thereof.

In some embodiments, the features and services provided by the first communication device 112 may be implemented as web services consumable via one or more communication networks. In further embodiments, the first communication device 112 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

In some embodiments, as shown, A first communication device 112 may include: one or more computer processors 402, such as physical central processing units ("CPUs"); one or more network interfaces 404, such as a network interface cards ("NICs"); one or more computer readable medium drives 406, such as a high density disk ("HDDs"), solid state drives ("SSDs"), flash drives, and/or other persistent non-transitory computer readable media; one or more input/output device interfaces 408, such as a display, a speaker, a microphone, a camera, and/or other components configured to allow the input or output of information; and one or more computer-readable memories 410, such as random access memory ("RAM") and/or other volatile non-transitory computer readable media.

The computer-readable memory 410 may include computer program instructions that one or more computer processors 402 execute and/or data that the one or more computer processors 402 use in order to implement one or more embodiments. For example, the computer-readable memory 410 can store an operating system 412 to provide general administration of the voice identification-based encrypted communication system 100. As another example, the computer-readable memory 410 can store speaker embeddings 414 (e.g., the speaker embedding store 180 of the voice-based encryption system 160) containing the individual speaker embeddings used by the voice-based encryption system 160 to identify individual speakers. As another example, the computer-readable memory 410 may store the voice-based encryption system 160, including some or all of the components described in FIG. 1B, used to enable speaker identification, encryption, decryption, and cryptographic key data generation and rotation for the first communication device 112.

The references above to the first communication device 112 serve as an example only, and some or all of the above-referenced components may be included in the communication management system 120, the second communication device 152, or in any other computing device in communication with the voice identification-based encrypted communication system 100.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
    a microphone;
    computer-readable memory storing a set of speaker embeddings; and
    one or more processors configured by executable instructions to:
        generate first cryptographic key data for communicating with a second system participating in a multi-participant audio conversation;
        receive sound information generated by the microphone, wherein the sound information represents speech occurring during the multi-participant audio conversation;
        generate a sound embedding using the sound information;
        compare the sound embedding to each speaker embedding of the set of speaker embeddings to generate a result, wherein individual speakers of the set of speaker embeddings are associated with individual participants in the multi-participant audio conversation;
        detect, based on the result, a change in a current active speaker in the multi-participant audio conversation;
        generate, in response to detecting the change in the current active speaker in the multi-participant audio conversation, second cryptographic key data based in part on a speaker embedding associated with the current active speaker; and
        replace the first cryptographic key data with the second cryptographic key data.

2. The system of claim 1, wherein the one or more processors are further configured by the executable instructions to:
    encrypt a message, based in part on the second cryptographic key data to generate an encrypted message; and
    transmit the encrypted message to the second system.

3. The system of claim 1, wherein the one or more processors are further configured by the executable instructions to:
    receive, from the microphone, second sound information;
    generate a second sound embedding using the second sound information;
    compare the second sound embedding to each speaker embedding of the set of speaker embeddings to generate a second result;
    identify, based on the second result, a second current active speaker;
    determine the second current active speaker is different from the current active speaker; and
    generate third cryptographic key data, based in part on a second speaker embedding associated with the second current active speaker; and
    replace the second cryptographic key data with the third cryptographic key data.

4. The system of claim 1, wherein the one or more processors are further configured by the executable instructions to:
    transmit at least a portion of the first cryptographic key data to the second system;
    receive, from the second system, an acknowledgement the portion of the first cryptographic key data was received.

5. A computer-implemented method comprising:
    as implemented by a first computing device comprising one or more processors configured to execute specific instructions,
        establishing a multi-participant conversation involving a second computing device;
        determining first cryptographic key data for use communicating with the second computing device;

receiving sound information representing speech captured by a microphone during the multi-participant conversation;

determining, based at least partly on the sound information, that a change in active speaker during the multi-participant conversation has occurred; and determining, based at least partly on the change in active speaker, second cryptographic key data for use in communication with the second computing device.

6. The computer-implemented method of claim 5, further comprising:

generating a sound embedding using the sound information;

comparing the sound embedding to each speaker embedding of a set of speaker embeddings stored in a memory of the first computing device to generate a result; and identifying, based on the result, a current active speaker, wherein the current active speaker is different from a prior active speaker.

7. The computer-implemented method of claim 6, further comprising:

receiving second sound information representing speech captured by the microphone during the multi-participant conversation;

generating a second sound embedding using the second sound information;

comparing the second sound information to each speaker embedding of the set of speaker embeddings stored in the memory of the first computing device to generate a second result;

identifying, based on the second result, a second active speaker, wherein the second active speaker differs from the active speaker;

generating third cryptographic key data; and replacing the second cryptographic key data with the third cryptographic key data.

8. The computer-implemented method of claim 6, further comprising:

receiving second sound information representing speech captured by the microphone during the multi-participant conversation;

generating a second sound embedding using the second sound information;

comparing the second sound embedding to each speaker embedding of the set of speaker embeddings stored in the memory of the first computing device to generate a second result;

determining, based at least partly on the second result, that no change in active speaker has occurred;

determining a time from the generation of the second cryptographic key data exceeds a threshold time;

generating third cryptographic key data; and replacing the second cryptographic key data with the third cryptographic key data.

9. The computer-implemented method of claim 6, wherein determining the second cryptographic key data comprises generating the second cryptographic key data based at least in part on a speaker embedding associated with the active speaker.

10. The computer-implemented method of claim 5, further comprising:

encrypting the sound information using the first cryptographic key data to generate first encrypted data;

sending the first encrypted data to the second computing device; and subsequent to determining that the change in active speaker has occurred:

receiving second sound information representing speech captured by the microphone during the multi-participant conversation;

encrypting the second sound information using the second cryptographic key data to generate second encrypted data; and sending the second encrypted data to the second computing device.

11. The computer-implemented method of claim 5, further comprising:

receiving first encrypted data from the second computing device;

decrypting the first encrypted data using the first cryptographic key data to obtain second sound information;

causing presentation of the second sound information; and subsequent to determining that the change in active speaker has occurred:

receiving second encrypted data from the second computing device;

decrypting the second encrypted data using the second cryptographic key data to obtain third sound information; and causing presentation of the third sound information.

12. The computer-implemented method of claim 5, further comprising replacing the first cryptographic key data with the second cryptographic key data.

13. The computer-implemented method of claim 5, further comprising:

transmitting a public portion of the first cryptographic key data to the second computing device;

receiving, from the second computing device, an acknowledgment the public portion has been received by the second computing device;

encrypting, in response to the acknowledgement, a message using the first cryptographic key data to generate encrypted data;

transmitting, to the second computing device, the encrypted data transmitting, in response to generating the second cryptographic key data, a second public portion of the second cryptographic key data to the second computing device;

receiving, from the second computing device, a second acknowledgment the second public portion has been received by the second computing device;

encrypting, in response to the second acknowledgement, a second message using the first cryptographic key data to generate second encrypted data; and transmitting, to the second computing device, the second encrypted data.

14. The computer-implemented method of claim 5, wherein the first computing device comprises a server in network communication with participants of the multi-participant conversation.

15. The computer-implemented method of claim 5, wherein the second computing device comprises the microphone.

16. A system comprising a first computing device comprising:

a sensor configured to generate sound information representing a sound;

a memory configured to store a set of speaker embeddings; and a computer-readable memory and one or more processors, wherein the one or more processors are configured to:

establish a multi-participant conversation involving a second computing device;

generate first cryptographic key data for use communicating with the second computing device;

receive, from the sensor, sound information representing speech occurring during the multi-participant conversation;

determine, based at least partly on the sound information, that a change in active speaker during the multi-participant conversation has occurred; and generate, based at least partly on the change in active speaker, second cryptographic key data for use in communication with the second computing device.

17. The system of claim 16, wherein the one or more processors are further configured to:

generate a sound embedding using the sound information;

compare the sound embedding to each speaker embedding of a set of speaker embeddings stored in the computer-readable memory of the first computing device to generate a result; and identify, based on the result, a current active speaker, wherein the current active speaker is different from a prior active speaker.

18. The system of claim 17, wherein the one or more processors are further configured to:

receive second sound information generated by the sensor, wherein the second sound information represents speech occurring during the multi-participant conversation;

generate second sound embedding using the second sound information;

compare the second sound information to each speaker embedding of the set of speaker embeddings stored in the computer-readable memory of the first computing device to generate a second result;

identify, based on the second result, a second active speaker, wherein the second active speaker differs from the active speaker;

generate third cryptographic key data; and replace the second cryptographic key data with the third cryptographic key data.

19. The system of claim 17, wherein the one or more processors are further configured to:

receive second sound information generated by the sensor of the first computing device, wherein the second sound information represents speech occurring during the multi-participant conversation;

generate second sound embedding using the second sound information;

compare the second sound embedding to each speaker embedding of the set of speaker embeddings stored in the computer-readable memory of the first computing device to generate a second result;

determine, based at least partly on the second result, that no change in active speaker has occurred;

determine a time from the generation of the second cryptographic key data exceeds a threshold time;

generate third cryptographic key data; and replace the second cryptographic key data with the third cryptographic key data.

20. The system of claim 16, wherein the one or more processors are further configured to:

encrypt the sound information using the first cryptographic key data to generate first encrypted data;

send the first encrypted data to the second computing device; and subsequent to determining that the change in active speaker has occurred:

receive second sound information generated by the sensor;

encrypt the second sound information using the second cryptographic key data to generate second encrypted data; and send the second encrypted data to the second computing device.

* * * * *